United States Patent
Levine et al.

(10) Patent No.: US 11,030,629 B2
(45) Date of Patent: *Jun. 8, 2021

(54) AUTONOMOUS DRIVING CERTIFICATION GENERALIZER

(71) Applicant: Ford Global Technologies, LLC, Dearborn, MI (US)

(72) Inventors: Daniel Levine, San Mateo, CA (US); Jinesh J Jain, San Mateo, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 338 days.

This patent is subject to a terminal disclaimer.

(21) Appl. No.: 15/910,769

(22) Filed: Mar. 2, 2018

(65) Prior Publication Data
US 2018/0189796 A1    Jul. 5, 2018

Related U.S. Application Data

(63) Continuation of application No. 14/843,514, filed on Sep. 2, 2015, now Pat. No. 9,940,625.

(51) Int. Cl.
*G06Q 30/00* (2012.01)
*G06F 16/29* (2019.01)
(Continued)

(52) U.S. Cl.
CPC .......... *G06Q 30/016* (2013.01); *G01C 21/32* (2013.01); *G06F 16/29* (2019.01); *G06F 16/9537* (2019.01)

(58) Field of Classification Search
CPC ... G06Q 30/016; G06F 16/29; G06F 16/9537; G01C 21/32; G01C 21/34; G05D 1/0088; B60K 2370/175; B60K 28/00; B60K 9/6223; B60K 6/218; B60K 9/00718; B60K 9/00785; B60K 9/00791; B64G 2001/247; B60W 60/0051; G05B 2219/32388; G05B 2219/39212; G06K 9/6223; G06K 6/218; G06K 9/00718; G06K 9/00791; G06T 7/11; B60T 2210/12; B60T 8/172; B60T 2250/04; G01W 1/14; G01J 5/0022; G01N 21/21; G01N 21/27; G01N 21/55;
(Continued)

(56) References Cited

U.S. PATENT DOCUMENTS

| | | | |
|---|---|---|---|
| 4,690,553 | A | 9/1987 | Fukamizu |
| 5,521,594 | A | 5/1996 | Fukushima |

(Continued)

FOREIGN PATENT DOCUMENTS

| | | |
|---|---|---|
| CN | 102197419 A | 9/2011 |
| CN | 10448911 A | 4/2015 |
| WO | WO-2013173911 A1 | 11/2013 |

*Primary Examiner* — Bhavesh V Amin
(74) *Attorney, Agent, or Firm* — David R. Stevens; Stevens Law Group (57) ABSTRACT

Methods, devices and apparatuses pertaining to identifying the candidate road segments for autonomous operations are described. A method may involve obtaining data of a first plurality of road segments that are permitted for one or more autonomous operations. The method may further include generating a road segment template based on the data of the first plurality of road segments, and reconstructing a second plurality of road segments based on the road segment template to obtain a plurality of reconstructed road segments.

19 Claims, 5 Drawing Sheets

(51) Int. Cl.
*G06F 16/9537* (2019.01)
*G01C 21/32* (2006.01)

(58) Field of Classification Search
CPC ....... G01N 21/84; G01S 17/88; G01S 7/4802; G01S 7/499; G01S 15/02; G01S 15/60; G01S 15/86; G01S 15/931; G01S 7/539; G09F 2007/005; G09F 27/005; B60G 17/0165; G01H 3/12; G07C 5/008; G08B 19/02; G08G 1/0116; G08G 1/04
See application file for complete search history.

(56) References Cited

U.S. PATENT DOCUMENTS

| | | | | |
|---|---|---|---|---|
| 6,385,539 | B1* | 5/2002 | Wilson | G01C 21/30 340/905 |
| 6,807,473 | B1 | 10/2004 | Tran | |
| 7,653,218 | B1* | 1/2010 | Malitz | G06K 9/0063 382/113 |
| 8,155,867 | B2 | 4/2012 | Krause | |
| 8,275,522 | B1* | 9/2012 | Groeneweg | G06Q 10/06 701/50 |
| 8,941,739 | B2 | 1/2015 | Yoo | |
| 9,940,625 | B2* | 4/2018 | Levine | G06F 16/29 |
| 2006/0241856 | A1* | 10/2006 | Cobleigh | G06T 17/05 701/533 |
| 2007/0029825 | A1* | 2/2007 | Franklin | G06Q 30/0284 293/128 |
| 2008/0162036 | A1* | 7/2008 | Breed | G08G 1/161 701/408 |
| 2012/0209512 | A1* | 8/2012 | Kujirai | G01C 21/3423 701/428 |
| 2013/0100286 | A1* | 4/2013 | Lao | G08G 1/04 348/148 |
| 2014/0278052 | A1* | 9/2014 | Slavin | G08G 1/0145 701/400 |
| 2015/0127245 | A1* | 5/2015 | Jang | G08G 1/0129 701/117 |
| 2015/0168174 | A1* | 6/2015 | Abramson | G01C 21/3626 701/408 |
| 2015/0170287 | A1* | 6/2015 | Tirone | G06Q 40/08 705/4 |
| 2015/0211870 | A1* | 7/2015 | Nickolaou | G01C 21/34 701/28 |
| 2017/0219364 | A1* | 8/2017 | Lathrop | G01C 21/3453 |

\* cited by examiner

AUTONOMOUS DRIVING CERTIFICATION GENERALIZER

CROSS REFERENCE TO RELATED PATENT APPLICATION

The present disclosure is part of a continuation application of U.S. patent application Ser. No. 14/843,514, filed on Sep. 2, 2015, the content of which is incorporated by reference in its entirety.

TECHNICAL FIELD

The present disclosure generally relates to autonomous driving and, more particularly, to methods and systems for identifying candidate road segments for autonomous operations.

BACKGROUND

The world is at a historic turning point for automotive travel. The relationship between vehicles and their drivers will likely change significantly. Current advancements in automotive technologies have created new possibilities for improving highway safety, increasing environmental benefits, and expanding mobility. On the other hand, autonomous vehicles (herein referring to vehicles driven not by a human operator but by a machine) are still a developing technology, and many companies and researchers have speculated about future developments and the possible effects of the vehicles. Therefore, the regulatory process for certifying high-level autonomous driving has not converged. It is possible that high-level autonomous driving may be permitted only in restricted settings in the near future.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Since regulatory processes for certifying high-level autonomous driving has not converged, high-level autonomy (e.g., National Highway Traffic Safety Administration (NHTSA) levels 3 and 4) may be permitted only in restricted settings. For example, only a certain number of road segments (e.g., on a whitelist) may be approved as being safe for high-level autonomous operations. Various factors may render a road segment amenable to being whitelisted. Implementations herein relate to methods and systems for extending a whitelist of road segments by identifying candidate road segments sharing similar or same properties with respect to existing road segments in the whitelist. In some implementations, road segment templates may be established using, for example, nonparametric clustering and geometric hashing techniques. In these instances, the established templates may be used to identify the candidate road segments.

Figure 1:
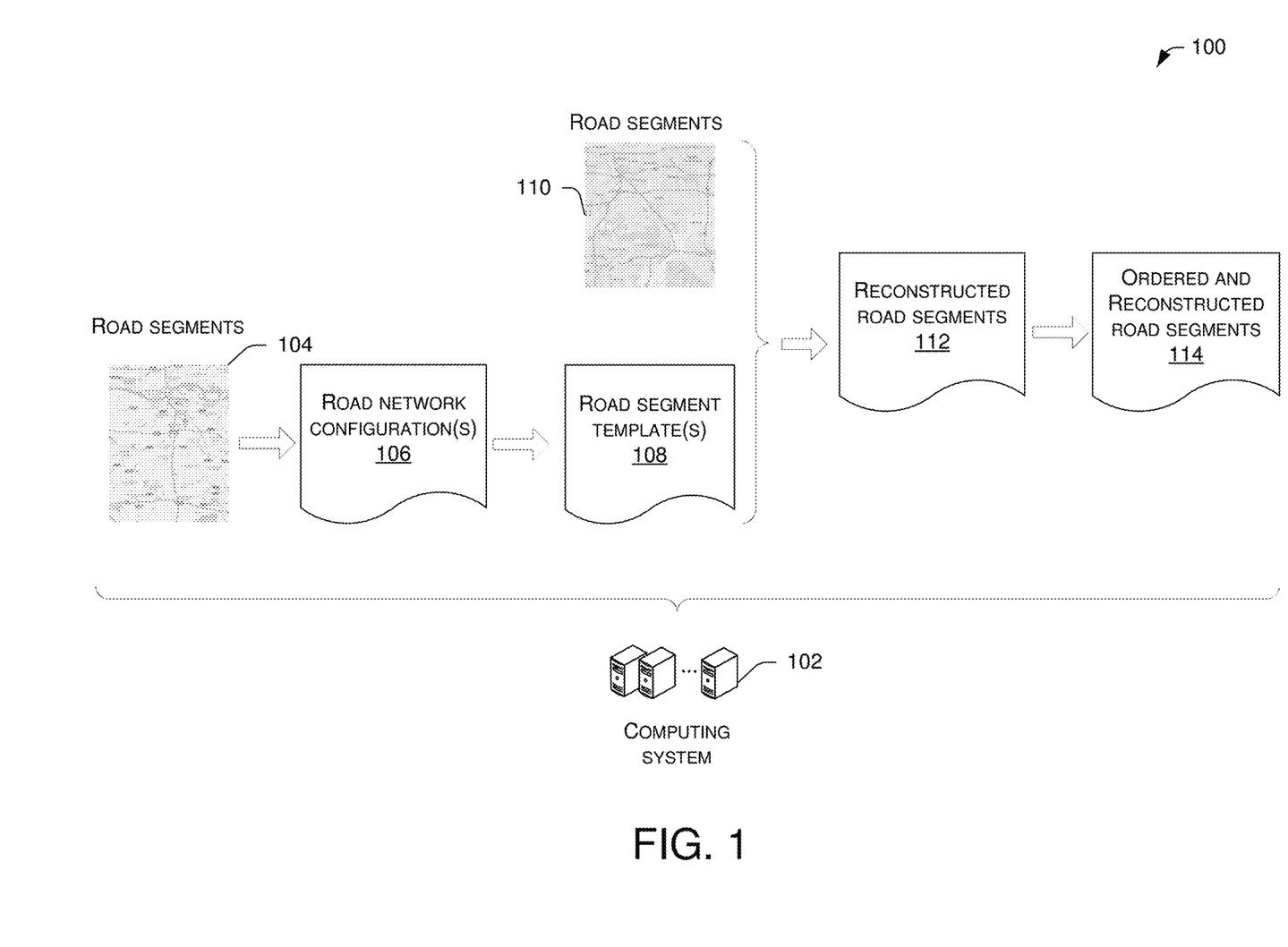
FIG. 1 is a diagram depicting an example scheme in which example embodiments of the present disclosure may be implemented.

FIG. 1 illustrates an example scheme 100 in which example embodiments of the present disclosure may be implemented. Example scheme 100 includes a computing system 102. Computing system 102 may include a single server or a collection of multiple servers in a distributed configuration (e.g., cloud computing service or server farm) or non-distributed configuration.

In accordance with various embodiments of the present disclosure, computing system 102 may include various modules, each discussed below. Computing system 102 may obtain data of a number of road segments 104, which include multiple road segments that have been permitted for autonomous operations in an autonomous level. The autonomous level may include, for example, at least one of NHTSA levels 2, 3 or 4. In these instances, road segments 104 are approved by a regulatory body (e.g., NHTSA) as being safe for high-level autonomous operations.

In some implementations, road segments 104 may include multiple road segments within a predetermined geographical area, such as a community, a city, a county, a state or province, or a country. In some implementations, these multiple road segments may be connected to one another and/or share similar features. The features may include, for example, geometry and/or topology of physical roads and/or road networks associated with road segments 104. Additionally or alternatively, the features may include visibility of lane markers, signage, and/or signals of road segments 104. Additionally or alternatively, the features may include dominant patterns of traffic of road segments 104.

Computing system 102 may analyze these features of road segments 104 and generate one or more road network configurations 106. Further, computing system 102 may redefine road network configuration 106 using one or more constraints to generate one or more road segment templates 108. In some implementations, computing system 102 may require a continuity condition and/or a contiguity condition in generating one or more road segment templates 108. With respect to continuity, multiple road segment templates meeting the continuity condition may be overlaid one over another and may share boundaries (e.g., having similar geometry). One constraint on the creation of templates may be thought of as guaranteeing complete, or gapless, coverage of the whitelisted road segments. That is, a set of road segment templates generated from whitelisted road segments need to be able to be used to reconstruct the same road segments in their entirety, and the reconstruction needs to be contiguous within each road segment in the whitelist.

Whether or not multiple road segment templates may be placed in particular overlapping configurations constitutes the evaluation of a continuity constraint which, when quantified, may be represented in a binary form (e.g., having a value of 0 or 1). The degree to which a road segment is covered in its entirety by reconstruction is the contiguity score (which may be normalized to be in the form of [0, 1]). Accordingly, in implementations of the present disclosure, it is required that the road segment templates be constructed from the whitelist in a way that contiguous sets of whitelisted road segments can be reconstructed with a contiguity score of 1. In reconstructing new road segments, computing system 102 needs to satisfy the continuity condition (e.g., sharing boundaries) as well as the contiguity condition (e.g., how well the road segments fit together and cover a geographical area without any gap between two reconstructed road segments). In some implementations, a given road segment not in the whitelist may be reconstructed from one or more road segment templates. For instance, some stretch of a road segment may be contiguous if there are no gaps, which requires that the road segment be reconstructed from road segment templates that overlap. Whether two or more road segment templates are allowed to overlap in a given configuration is specified by the continuity constraints. In some implementations, reconstructed road segments may be scored based on their contiguity and how well they fit to the road segment templates. Thus, in constructing a new whitelist, computing system 102 may score candidate road segments based on how contiguous the candidate road segments are and how well they fit the road segment templates, which may be distributed over different scenes.

Using a road segment template 108, computing system 102 may reconstruct road segments 110 to generate reconstructed road segments 112. In some implementations, reconstructed road segments 112 may include multiple road segments sharing features similar to or same as those identified from road segments 104. In reconstructing new road segments, computing system 102 needs to satisfy the continuity condition (e.g., sharing boundaries) as well as the contiguity condition (e.g., how well the road segments fit together and cover a geographical area without any gap between two reconstructed road segments).

In some implementations, computing system 102 may rank reconstructed road segments 112 by imposing one or more constraints on reconstructed road segments 112 to generate ordered and reconstructed road segments 114. In some implementations, computing system 102 may schedule a road test on a road segment from reconstructed road segments 112 or a road segment from the ordered and reconstructed road segments 114. In some implementations, one or more reconstructed road segments 112 or one or more ordered and reconstructed road segments 114 may be proposed to one or more regulatory bodies (e.g., including or in addition to NHTSA) as candidate road segment(s) to become newly added whitelisted road segment(s) for autonomous operations.

Figure 2:
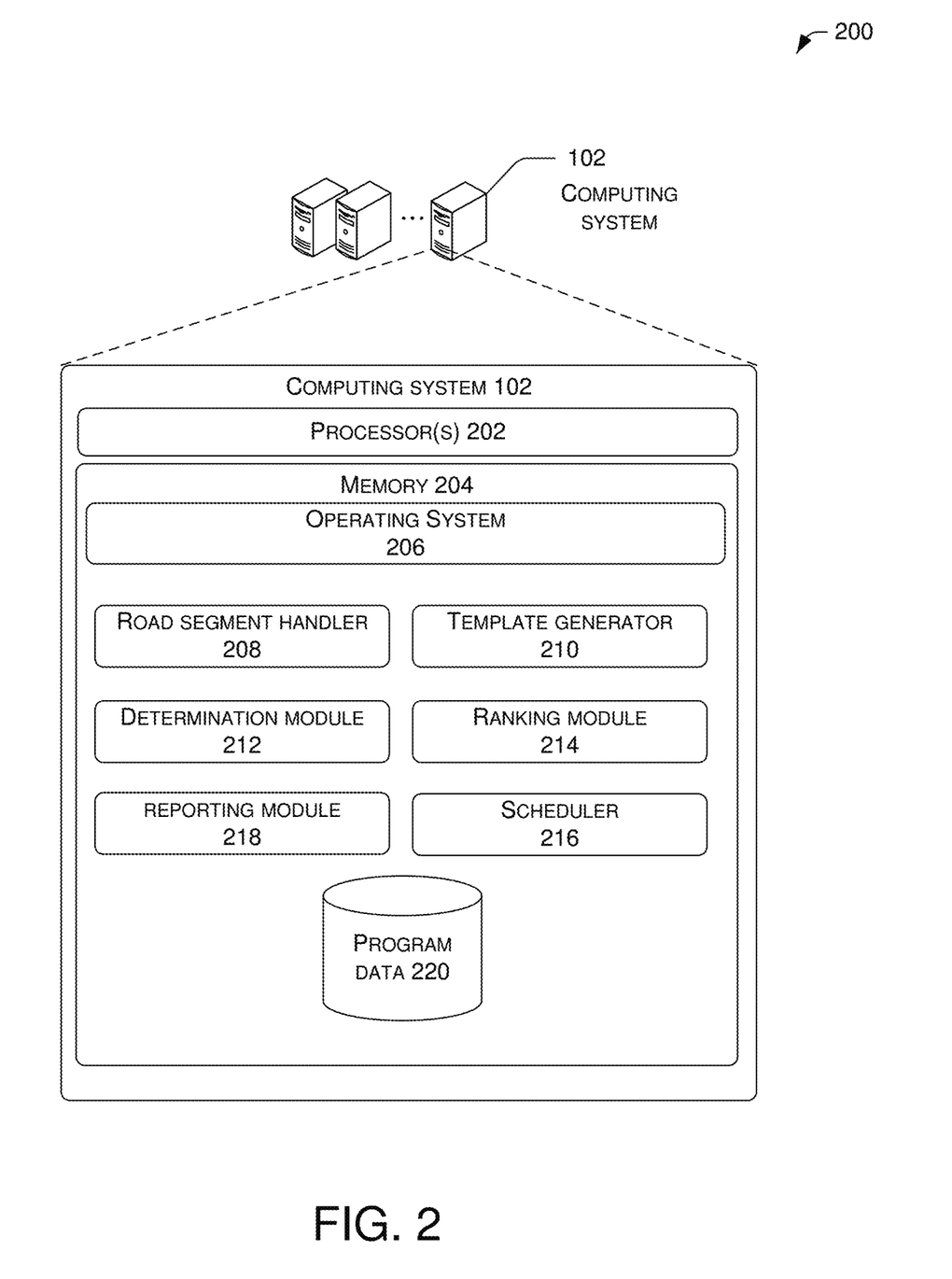
FIG. 2 is a block diagram depicting an example apparatus in accordance with an embodiment of the present disclosure.

FIG. 2 illustrates an example architecture 200 in accordance with an embodiment of the present disclosure. Computing architecture 200 shows additional details of computing system 102, which may include additional modules, kernels, data, and/or hardware.

Computing system 102 may include processor(s) 202 and memory 204. Memory 204 may store various modules, applications, programs, or other data. Memory 204 may include one or more sets of instructions that, when executed by the processor(s) 202, cause processor(s) 202 to perform the operations described herein for computing system 102. Processor(s) 202 may include one or more graphics processing units (GPU) and one or more central processing units (CPU).

Computing system 102 may have additional features and/or functionalities. For example, computing system 102 may also include additional data storage devices (removable and/or non-removable) including computer-readable media. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, program data, or other data. The system memory, the removable storage and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other medium that can be used to store the desired information and which can be accessed by computing system 102. Any such computer storage media may be part of computing system 102. Moreover, the computer-readable media may include computer-executable instructions that, when executed by the processor(s), perform various functions and/or operations described herein.

Memory 204 may store an operating system 206 as well as various modules such as road segment handler 208, a template generator 210, a determination module 212, a ranking module 214, a scheduler 216, and a reporting module 218 and/or program data 220.

Road segment handler 208 may be configured to analyze multiple road segments such as road segments 104 and road segments 110. Suppose that road segments 104 have already been approved as being safe for autonomous operations. In this example, the autonomous level may include at least one of the following: driver assistance, partial automation, conditional automation, high automation, or full automation. In these instances, road segments 104 may belong to a whitelist and may include multiple road segments approved as being safe for high-level autonomous operations, while road segments 110 have not been whitelisted. Implementations of the present disclosure may identify one or more particular road segments in road segments 110 that are sufficiently similar to those in road segments 104. These one or more particular road segments may be offered as candidates to be added to a new whitelist or an existing whitelist.

In some implementations, road segment handler 208 may obtain data of road segments 104 and road segments 110. In these instances, road segments 104 are whitelisted as being safe for high-level autonomous operations, while road segments 110 are not whitelisted. The data of road segments 104 may include, for example, statistics on road segments 104 pertaining to topological and/or geometrical data, visibility, mobility and/or traffic patterns. In these instances, topological and/or geometrical data may be obtained using Geographic Information System (GIS) surveys. Data related to visibility may be obtained using camera and/or a Light Detection and Ranging (LIDAR) system installed on vehicles that have been on road segments 104. Data related to mobility and traffic patterns may be retrieved from telematics data of vehicles that have been on road segments 104.

Template generator 210 may be configured to generate a road segment template 108 based on the data of road segments 104. In some implementations, template generator 210 may partition the road segments 104 using a nonparametric clustering technique to identify road network configuration 106. The use of nonparametric clustering technique herein refers to the use of a clustering technique without pre-defining a fixed, finite set of parameters for the clustering. Examples of a clustering technique may include, for example and not limited to, deep learning based techniques, k-means clustering, and hierarchical clustering. Road network configuration 106 may include multiple attributes and values corresponding to the multiple attributes. The multiple attributes may be related to at least one of topology and geometry, visibility, mobility profiles, traffic patterns, traffic signage and signals, or environmental factors associated with road segments 104.

In some implementations, template generator 201 may impose a constraint on road network configuration 106 to generate road segment template 108. In these instances, the constraint may include a contiguity condition and/or a continuity condition. For example, the contiguity condition may indicate connectedness of each of one or more individual road segments of road segments 104 with respect to one or more other road segments of road segments 104. The continuity condition may indicate a similarity of mobility profiles of one or more pairs of road segments of road segments 104. Imposing a measure of continuity may avoid a situation that a road segment is reconstructed from two road segments with different mobility profiles (e.g., a school zone and a freeway).

Determination module 212 may be configured to reconstruct road segments 110 based on road segment template 108 to generate reconstructed road segments 112. Reconstructed road segments 112 may include one or more candidate road segments sharing one or more properties similar to those of road segments 104.

Ranking module 214 may be configured to rank the reconstructed road segments 112 based on a contiguity condition. In some implementations, the contiguity condition may indicate connectedness of each of one or more individual road segments of reconstructed road segments 112 with respect to one or more other road segments of road segments 112. In these instances, reconstructed road segments 112 may be prioritized to obtain one or more road segments for road tests. For example, scheduler 216 may be configured to select the one or more road segments from reconstructed road segments 112, and schedule a road test on the one or more road segments. Reporting module 218 may be configured to submit the one or more road segments of reconstructed road segments 112 as one or more candidate road segments to a regulatory body for a permit for the autonomous operations in the autonomous level on the one or more candidate road segments.

Figure 3:
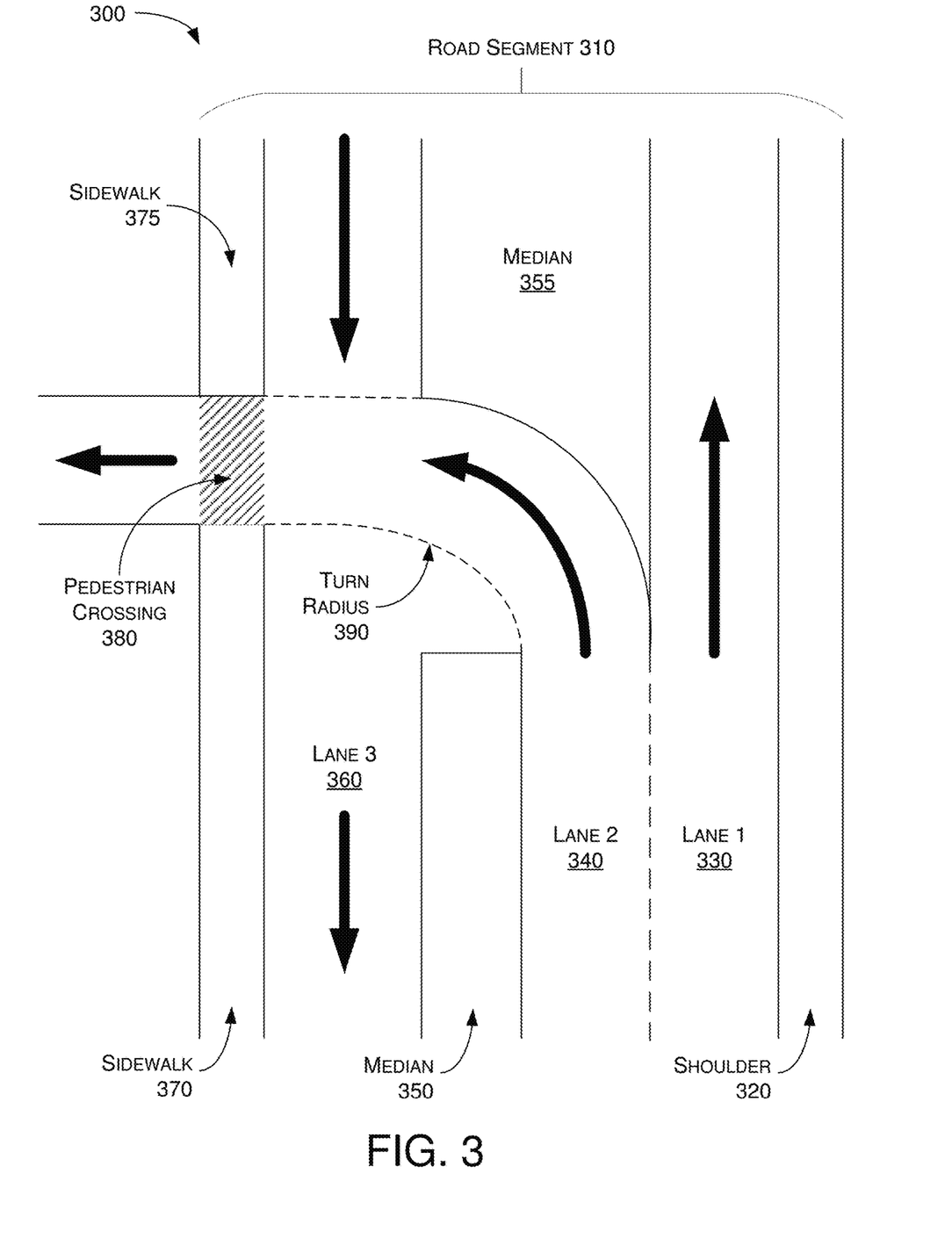
FIG. 3 is a diagram depicting an example road segment template in accordance with an embodiment of the present disclosure.

FIG. 3 illustrates an example road segment template 300 in accordance with an embodiment of the present disclosure. Example road segment template 300 may be an illustrative, non-limiting implementation of a road segment template of the one or more road segment templates 108 in example scheme 100. Example road segment template 300 may include data pertaining to the attributes, parameters and/or characteristics of a road segment 310. For instance, example road segment template 300 may specify the features, geometry, road metrics, speed limit, turn radius/radii, functional class as well as distributions of various parameters with respect to road segment 310. In the example shown in FIG. 3, example road segment template 300 may specify the features of road segment 310 to include a shoulder 320, a first lane 330 adjacent shoulder 320 and for traffic in a first direction, a second lane 340 for traffic in the first direction, a third lane 360 for traffic in a second direction opposite to the first direction, a first road median 350 that divides second lane 340 and third lane 360, a second road median 355 that divides first lane 330 and third lane 360, a turn radius 390 of second lane 340, a first sidewalk 370 and a second sidewalk 375 adjacent third lane 360 and extending from both sides of second lane 340 after the turn, and a pedestrian crossing 380 across second lane 340 after the turn and connecting first sidewalk 370 and second sidewalk 375.

In some implementations, example road segment template 300 may specify the grade, curvature and/or surface type of road segment 310. In some implementations, example road segment template 300 may specify a number of functional classes to classify road segment 310 to be a freeway (e.g., by classifying road segment 310 as a functional class 1 road segment), a highway segment (e.g., by classifying road segment 310 as a functional class 2 road segment), a city/local driving segment (e.g., by classifying road segment 310 as a functional class 3 road segment), or a rural/dirt road driving segment (e.g., by classifying road segment 310 as a functional class 4 road segment). In some implementations, example road segment template 300 may specify a number of distributions of parameters including, for example, a distribution of speeds of vehicles traveling on road segment 310, a distribution of occupancy of vehicles traveling on road segment 310, and a distribution of vehicle models of vehicles traveling on road segment 310.

Figure 4:
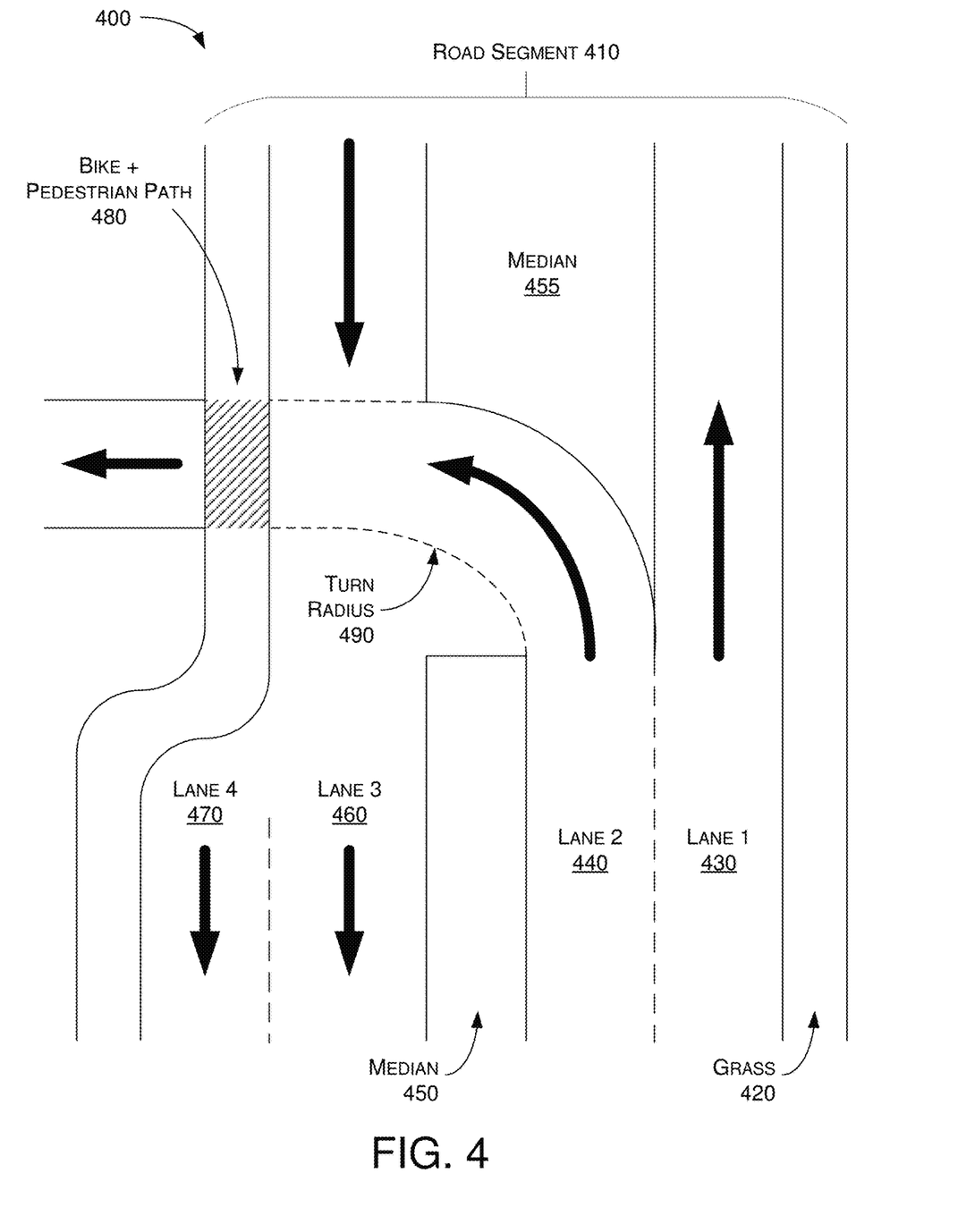
FIG. 4 is a diagram depicting another example road segment template in accordance with an embodiment of the present disclosure.

FIG. 4 illustrates an example road segment template 400 in accordance with an embodiment of the present disclosure. Example road segment template 400 may be an illustrative, non-limiting implementation of a road segment template of the one or more road segment templates 108 in example scheme 100. Example road segment template 400 may include data pertaining to the attributes, parameters and/or characteristics of a road segment 410. For instance, example road segment template 400 may specify the features, geometry, road metrics, speed limit, turn radius/radii, functional class as well as distributions of various parameters with respect to road segment 410. In the example shown in FIG. 4, example road segment template 400 may specify the features of road segment 410 to include a strip of grass 420, a first lane 430 adjacent the strip of grass 420 and for traffic in a first direction, a second lane 440 for traffic in the first direction, a third lane 460 for traffic in a second direction opposite to the first direction, a fourth lane 470 for traffic in the second direction, a first road median 450 that divides second lane 440 and third lane 460, a second road median 455 that divides first lane 430 and third lane 460, a turn radius 490 of second lane 440, and a bike and pedestrian path 480 adjacent third lane 460 and fourth lane 470 and may travel over or under second lane 440 after the turn.

In some implementations, example road segment template 400 may specify the grade, curvature and/or surface type of road segment 410. In some implementations, example road segment template 400 may specify a number of functional classes to classify road segment 410 to be a freeway (e.g., by classifying road segment 410 as a functional class 1 road segment), a highway segment (e.g., by classifying road segment 410 as a functional class 2 road segment), a city/local driving segment (e.g., by classifying road segment 410 as a functional class 4 road segment), or a rural/dirt road driving segment (e.g., by classifying road segment 410 as a functional class 4 road segment). In some implementations, example road segment template 400 may specify a number of distributions of parameters including, for example, a distribution of speeds of vehicles traveling on road segment 410, a distribution of occupancy of vehicles traveling on road segment 410, and a distribution of vehicle models of vehicles traveling on road segment 410.

Figure 5:
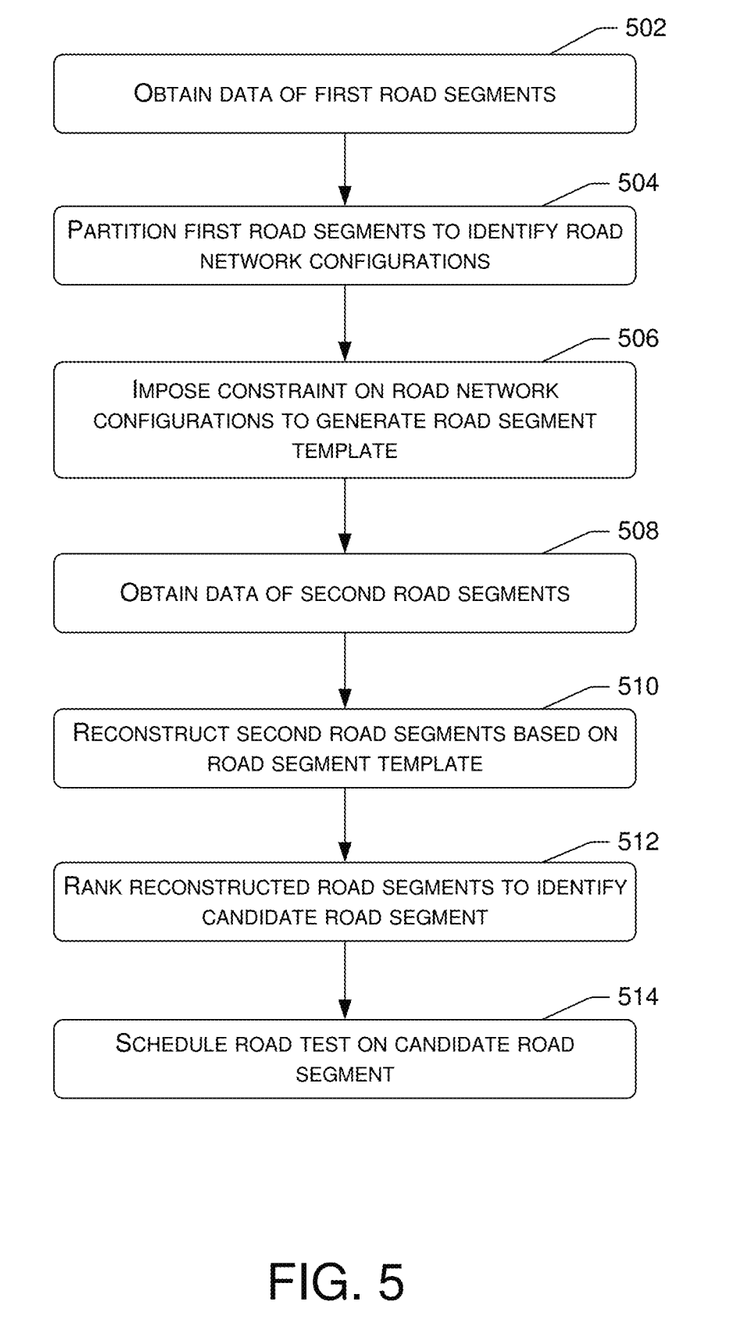
FIG. 5 is a flowchart depicting an example process in accordance with an embodiment of the present disclosure.

FIG. 5 illustrates an example process 500 implementing an embodiment in accordance with the present disclosure. Example process 500 may be one of various implementation scenarios based on example scheme 100, and is provided solely for illustrative purpose so that those skilled in the art may better appreciate benefits and advantages provided by the present disclosure. Therefore, the scope of the present disclosure is not limited by example process 500. For illustration purpose and not limiting the scope of the present disclosure, the description of example process 500 is provided below in the context of implementation using processor 202 of computing apparatus 200.

At 502, processor 202 may obtain data of road segments 104 that are permitted for autonomous operations in an autonomous level. The autonomous level may include, for example, at least one of the following: driver assistance, partial automation, conditional automation, high automation or full automation. Example process 500 may proceed from 502 to 504.

At 504, processor 202 may partition road segments 104 using a nonparametric clustering technique to identify road network configurations 106. Road network configurations 106 may include multiple attributes and values corresponding to the multiple attributes. The multiple attributes may relate to at least one of topology, geometry, visibility, mobility profiles, traffic patterns, traffic signage and signals and/or environmental factors associated with the road segments 104. Example process 500 may proceed from 504 to 506.

At 506, processor 202 may impose a constraint on the plurality of road network configurations 106 to generate a road segment template 108. The constraint may include a contiguity condition and/or a continuity condition. The contiguity condition may indicate connectedness of each of one or more individual road segments of the road segments 104 with respect to one or more other road segments of road segments 104. The continuity condition may indicate a similarity of mobility profiles of one or more pairs of road segments of the road segments 104. Example process 500 may proceed from 506 to 508.

At 508, processor 202 may obtain data of road segments 110. Road segments 110 include road segments that have not been permitted for the autonomous operations in a certain autonomous level, such as NHTSA levels 2, 3 or 4. Example process 500 may proceed from 508 to 510.

At 510, processor 202 may reconstruct road segments 110 based on road segment template 108 to obtain reconstructed road segments 112. In some implementations, reconstructed road segments 112 may include multiple road segments sharing features similar to or same as those identified from road segments 104. Example process 500 may proceed from 510 to 512.

At 512, processor 202 may rank reconstructed road segments 112 based on a contiguity condition indicating connectedness of each of one or more individual road segments of reconstructed road segments 110 with respect to one or more other road segments of road segments 110. Example process 500 may proceed from 512 to 514.

At 514, processor 202 may select one or more road segments from reconstructed road segments 112, and schedule a road test on the selected one or more road segments. In some implementations, processor 202 may select one or more road segments of reconstructed road segments 112 as one or more candidate road segments. Processor 202 may further submit the one or more candidate road segments to a regulatory body for a permit for the autonomous operations.

The articles "a" and "an" are used herein to refer to one or to more than one (i.e., to at least one) of the grammatical object of the article. By way of example, "a user" means one user or more than one users. Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code or the like), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions, operations or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Although the present disclosure is described in terms of certain embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method, comprising:
obtaining, by a processor of a computing system, data of a first plurality of road segments permitted for one or more autonomous operations in an autonomous level, the obtaining of the data of the first plurality of road segments comprises operating one or more vehicles on the first plurality of road segments to collect statistics on the first plurality of road segments using a Geographic Information System (GIS), a camera and a Light Detection and Ranging (LIDAR) system, telematics, or a combination thereof, installed on the one or more vehicles;
generating, by the processor, a road segment template based on the data of the first plurality of road segments;
obtaining, by the processor, data of a second plurality of road segments that have not been permitted for the one or more autonomous operations in the autonomous level; and
reconstructing, by the processor, the second plurality of road segments in the computing system based on the road segment template to provide a plurality of reconstructed road segments in the computing system,
wherein the generating of the road segment template based on the first plurality of road segments comprises partitioning the first plurality of road segments using a nonparametric clustering technique to identify a plurality of road network configurations, and
wherein the using of the nonparametric clustering technique comprises using deep learning or using both the deep learning and hierarchical clustering.

2. The method of claim 1, wherein the autonomous level comprises driver assistance, partial automation, conditional automation, high automation, full automation, or a combination thereof.

3. The method of claim 1, wherein the generating of the road segment template based on the first plurality of road segments further comprises:
imposing a constraint on the plurality of road network configurations to generate the road segment template.

4. The method of claim 3, wherein the plurality of road network configurations comprise a plurality of attributes and a plurality of values corresponding to the plurality of attributes.

5. The method of claim 4, wherein the plurality of attributes are associated with at least one of topology, geometry, visibility, mobility profiles, traffic signage and signals, or environmental factors associated with the first plurality of road segments.

6. The method of claim 3, wherein the constraint comprises a contiguity condition, and wherein the contiguity condition indicates connectedness of each of one or more individual road segments of the first plurality of road segments with respect to one or more other road segments of the first plurality of road segments.

7. The method of claim 3, wherein the constraint comprises a continuity condition, and wherein the continuity condition indicates a similarity of mobility profiles of two road segments of the first plurality of road segments.

8. The method of claim 1, further comprising:
submitting one or more road segments of the plurality of reconstructed road segments as one or more candidate road segments to a receiving party.

9. The method of claim 1, further comprising:
ranking the plurality of reconstructed road segments based on a contiguity condition indicating connectedness of each of one or more individual road segments of the plurality of reconstructed road segments.

10. The method of claim 1, further comprising:
selecting one or more road segments from the plurality of reconstructed road segments; and
scheduling a road test on the selected one or more road segments.

11. A method, comprising:
obtaining, by a processor of a computing system, data of a first plurality of road segments permitted for one or more autonomous operations in an autonomous level, the obtaining of the data of the first plurality of road segments comprises operating one or more vehicles on the first plurality of road segments to collect statistics on the first plurality of road segments;
generating, by the processor, a road segment template based on the data of the first plurality of road segments;
obtaining, by the processor, data of a second plurality of road segments that have not been permitted for the one or more autonomous operations in the autonomous level; and
reconstructing, by the processor, the second plurality of road segments in the computing system based on the road segment template to provide a plurality of reconstructed road segments in the computing system,
wherein the autonomous level comprises driver assistance, partial automation, conditional automation, high automation, full automation, or a combination thereof,
wherein the generating of the road segment template based on the first plurality of road segments comprises partitioning the first plurality of road segments using a nonparametric clustering technique to identify a plurality of road network configurations, and
wherein the using of the nonparametric clustering technique comprises using deep learning or using the deep learning and hierarchical clustering.

12. The method of claim 11, wherein the generating of the road segment template based on the first plurality of road segments further comprises:
imposing a constraint on the plurality of road network configurations to generate the road segment template.

13. The method of claim 12, wherein the plurality of road network configurations comprise a plurality of attributes and a plurality of values corresponding to the plurality of attributes.

14. The method of claim 13, wherein the plurality of attributes are associated with at least one of topology, geometry, visibility, mobility profiles, traffic signage and signals, or environmental factors associated with the first plurality of road segments.

15. The method of claim 12, wherein the constraint comprises a contiguity condition, and wherein the contiguity condition indicates connectedness of each of one or more individual road segments of the first plurality of road segments with respect to one or more other road segments of the first plurality of road segments.

16. The method of claim 12, wherein the constraint comprises a continuity condition, and wherein the continuity condition indicates a similarity of mobility profiles of two road segments of the first plurality of road segments.

17. The method of claim 11, further comprising:
submitting one or more road segments of the plurality of reconstructed road segments as one or more candidate road segments to a receiving party.

18. The method of claim 11, further comprising:
ranking the plurality of reconstructed road segments based on a contiguity condition indicating connectedness of each of one or more individual road segments of the plurality of reconstructed road segments.

19. The method of claim 11, further comprising:
selecting one or more road segments from the plurality of reconstructed road segments; and
scheduling a road test on the selected one or more road segments.

* * * * *